US011796342B2

(12) United States Patent
Daniel

(10) Patent No.: US 11,796,342 B2
(45) Date of Patent: Oct. 24, 2023

(54) PRODUCTION OF DIGITAL ROAD MAPS BY CROWDSOURCING

(71) Applicants: Continental Automotive France, Toulouse (FR); Continental Automotive GmbH, Hannover (DE)

(72) Inventor: Fabien Daniel, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 247 days.

(21) Appl. No.: 17/311,493

(22) PCT Filed: Dec. 12, 2019

(86) PCT No.: PCT/EP2019/084971
§ 371 (c)(1),
(2) Date: Jun. 7, 2021

(87) PCT Pub. No.: WO2020/120707
PCT Pub. Date: Jun. 18, 2020

(65) Prior Publication Data

US 2022/0026237 A1 Jan. 27, 2022

(30) Foreign Application Priority Data

Dec. 13, 2018 (FR) ...................................... 1872815

(51) Int. Cl.
*G01C 21/00* (2006.01)

(52) U.S. Cl.
CPC ..... *G01C 21/3841* (2020.08); *G01C 21/3815* (2020.08); *G01C 21/3859* (2020.08)

(58) Field of Classification Search
CPC ............ G01C 21/3841; G01C 21/3815; G01C 21/3859; G09B 29/007; G09B 29/106
See application file for complete search history.

(56) References Cited

U.S. PATENT DOCUMENTS

2004/0230370 A1 11/2004 Tzamaloukas
2012/0095682 A1 4/2012 Wilson
(Continued)

FOREIGN PATENT DOCUMENTS

EP 3293489 A1 3/2018

OTHER PUBLICATIONS

English Translation of Written Opinion of the International Searching Authority for International Application No. PCT/EP2019/084971, dated Mar. 16, 2020, 7 pages.
(Continued)

*Primary Examiner* — Anne Marie Antonucci
*Assistant Examiner* — Jewel Ashley Kuntz
(74) *Attorney, Agent, or Firm* — RatnerPrestia

(57) ABSTRACT

Computer systems and methods for updating and/or supplementing a digital road map through crowdsourcing, based on the generalization of geolocation systems that are integrated in the majority of modern road vehicles. The signals collected by these geolocation systems are used to update and/or supplement a digital road map through crowdsourcing. The collected data make it possible to extract data from geographical traces associated with vehicles traveling the road network and: extracting, for each geographical trace, a trajectory curve passing substantially through all of the measurements of the geographical trace; detecting the inflection points (vertices) of each trajectory curve; grouping together all of the vertices into a plurality of vertex classes, using an unsupervised classification algorithm; selecting the most central vertex in each vertex class (representative); forming, from each geographical trace, a road segment between representatives that successively intersect the course of the geographical trace when they are considered in pairs.

7 Claims, 1 Drawing Sheet

100
200
130
131
10
110
111
111
120
110

(56) References Cited

U.S. PATENT DOCUMENTS

| | | | | |
|---|---|---|---|---|
| 2018/0066957 | A1* | 3/2018 | Stroila | G01C 21/3841 |
| 2018/0100741 | A1 | 4/2018 | Phuyal et al. | |
| 2020/0018607 | A1* | 1/2020 | Balu | H04W 12/02 |
| 2020/0167576 | A1* | 5/2020 | Gonzalez | B60W 30/165 |

OTHER PUBLICATIONS

Xie, X. et al., "Inferring Directed Road Networks from GPS Traces by Track Alignment," Nov. 11, 2015, 4, pp. 2446-2471, ISPRS International Journal of Geo-Information.
Ahmed, M. et al., "A Comparison and Evaluation of Map Construction Algorithms Using Vehicle Tracking Data," 2015, pp. 1-31.
Qiu, J. et al., "Road Map inference: A Segmentation and Grouping Framework," Jul. 23, 2016, 5, 130. pp. 1-20, ISPRS International Journal of Geo-Information.
Zhang, Y., et al., "An Automatic Road Network Construction Method Using Massive GPS Trajectory Data," 2017, 6, 400, pp. 1-15, ISPRS International Journal of Geo-Information.
Li, H., et al., "Automatic Generation and Validation of Road Maps from GPS Trajectory Data Sets," Department of Computing and Information Systems, The University of Melborne, Victoria 3010, Australia, DOI: http://dx.doi.org/10.1145/2983323.2983797, CIKM, Oct. 24-28, 2016, 10 pages.
Biagioni, J., et al., "Inferring Road Maps from Global Positioning System Traces, Survey and Comparative Evaluation," 2012, Department of Computer Science, University of Illinois at Chicago, Transportation Research Record: Journal of the Transportation Research Board, No. 2291, pp. 61-71.
International Search Report and Written Opinion for International Application No. PCT/EP2019/084971, dated Mar. 16, 2020, with partial English translation, 10 pages.
International Search Report and Written Opinion for International Application No. PCT/EP2019/084971, dated Mar. 16, 2020, 15 pages (French).

* cited by examiner

PRODUCTION OF DIGITAL ROAD MAPS BY CROWDSOURCING

CROSS REFERENCE TO RELATED APPLICATIONS

This application is the U.S. National Phase Application of PCT International Application No. PCT/EP2019/084971, filed Dec. 12, 2019, which claims priority to French Patent Application No. 1872815, filed Dec. 13, 2018, the contents of such applications being incorporated by reference herein.

TECHNICAL FIELD

The present invention relates to the field of digital road mapping. It relates more precisely to computer systems and methods for updating and/or supplementing a digital road map through crowdsourcing.

BACKGROUND OF THE INVENTION

Terrestrial navigation is generally used to provide an indication of the position of a road vehicle. Since said road vehicle generally travels on the road network, the position indication may refer to a digital road map representative of the road network, thereby allowing the driver of the vehicle to have highly specific visual information enabling him to make decisions to change direction at landmarks on the road network.

However, over the course of a year, the majority of digital road map providers provide fewer than four map updates. This is unsatisfactory.

Thus, to date, there are no effective methods for regularly updating a digital road map.

SUMMARY OF THE INVENTION

The present invention therefore aims to overcome the abovementioned drawbacks.

To this end, a first aspect of the invention relates to a computer system for updating and/or supplementing a digital road map through crowdsourcing.

A second aspect of the invention relates to a method for updating and/or supplementing a digital road map through crowdsourcing.

Finally, a third aspect of the invention relates to a computer program with a program code for executing the method steps of the methods according to the second aspect of the invention when the computer program is loaded into the computer or run on the computer.

The invention thus relates to a computer system for updating and/or supplementing a digital road map through crowdsourcing. The computer system comprises:

- a plurality of road vehicles for traveling on a road network during at least one driving session, each road vehicle comprising a position sensor for measuring a plurality of geographical coordinates of the road vehicle traveling on the road network,
- at least one data collection server for receiving the geographical coordinate measurements associated with each driving session, hereinafter called geographical traces,
- at least one processor for:
  - extracting, for each geographical trace, a trajectory curve passing substantially through all of the measurements of the geographical trace,
  - detecting the inflection points of each trajectory curve, hereinafter called vertices,
  - grouping together all of the vertices into a plurality of vertex classes, using an unsupervised classification algorithm,
  - selecting the most central vertex in each vertex class, hereinafter called representative,
  - forming, from each geographical trace, a road segment between representatives that successively intersect the course of the geographical trace when they are considered in pairs,
  - joining, based on a superposition of the geographical traces, the road segments that successively intersect the course of the superposition of the geographical traces, so as to obtain digital road sections, and
  - updating and/or supplementing the digital road map based on the digital road sections.

According to a first embodiment, the processor is furthermore configured so as, before updating and/or supplementing the digital road map, to:

- calculate, for each road segment, a regression function from the geographical traces substantially following the road segment, and
- adapt the shape of each road segment based on the associated regression function, such that the road segment matches the shape of the regression function.

According to a second embodiment, the processor is furthermore configured so as, when calculating the regression function, to

- calculate, for each road segment, a measure of statistical dispersion between the geographical traces, wherein the measure of dispersion represents the number of lanes of the road segment.

According to a third embodiment, the processor is furthermore configured so as, before updating and/or supplementing the digital road map, to:

- identify redundant road segments based on a distance between the segments, and
- delete the redundant road segments so as to keep only one road segment between two consecutive representatives.

The invention also covers a method for updating and/or supplementing a digital road map through crowdsourcing. The method comprises the following steps:

- a first step of providing a plurality of road vehicles for traveling on a road network during at least one driving session, each road vehicle comprising a position sensor for measuring a plurality of geographical coordinates of the road vehicle traveling on the road network,
- a second step of providing at least one data collection server for receiving the geographical coordinate measurements associated with each driving session, hereinafter called geographical traces,
- a first step of extracting, for each geographical trace, a trajectory curve passing substantially through all of the measurements of the geographical trace,
- a step of detecting the inflection points of each trajectory curve, hereinafter called vertices,
- a step of grouping together all of the vertices into a plurality of vertex classes, using an unsupervised classification algorithm,
- a step of selecting the most central vertex in each vertex class, hereinafter called representative,
- a second step of forming, from each geographical trace, a road segment between representatives that successively intersect the course of the geographical trace when they are considered in pairs, a step of joining, based on a superposition of the geographical traces, the road segments that intersect the course of the superposition of the geographical traces, and a step of updating and/or supplementing the digital road map based on the digital road sections.

According to a first embodiment, the method furthermore comprises the following steps, before the step of updating and/or supplementing the digital road map:

a first step of calculating, for each road segment, a regression function from the geographical traces substantially following the road segment, and a step of adapting the shape of each road segment based on the associated regression function, such that the road segment matches the shape of the regression function.

According to a second embodiment, the method furthermore comprises the following step, during the first step of calculating the regression function:

a second step of calculating, for each road segment, a measure of statistical dispersion between the geographical traces, wherein the measure of dispersion represents the number of lanes of the road segment.

According to a third embodiment, the method furthermore comprises the following steps, before the step of updating and/or supplementing the digital road map:

a step of identifying redundant road segments based on a distance between the segments, and a step of deleting the redundant road segments so as to keep only one road segment between two consecutive representatives.

The invention also covers a computer program with a program code for executing the steps of the method according to the second aspect of the invention when the computer program is loaded into the computer or run on the computer.

BRIEF DESCRIPTION OF THE FIGURES

Other features and advantages of the invention will be better understood on reading the following description with reference to the appended drawings, which are non-limiting and given by way of illustration.

For the sake of clarity, the elements that are shown have not necessarily been shown on the same scale with respect to one another, unless indicated otherwise.

DETAILED DESCRIPTION OF THE PREFERRED EMBODIMENTS

The general principle of the invention is based on the generalization of geolocation systems that are integrated in the majority of modern road vehicles. The invention takes advantage of this and uses the large number of signals collected by these geolocation systems to update and/or supplement a digital road map through crowdsourcing.

Figure 1:
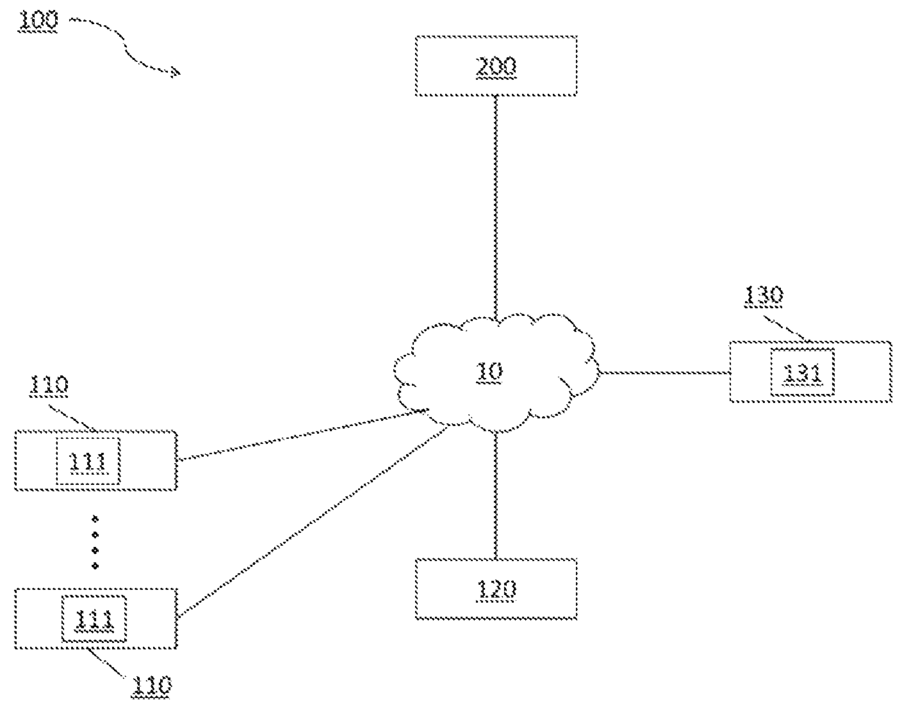
FIG. 1 shows a computer system according to the invention.

FIG. 1 illustrates a computer system 100 according to the invention. The computer system 100 comprises a plurality of road vehicles 110, at least one data collection server 120 and at least one processor 130. The computer system 100 is furthermore designed with a cloud computing architecture (cloud computing system) that is based on a wireless communication network 10.

In the example of FIG. 1, the road vehicles 110 are intended to travel on a road network (not shown) during at least one driving session. A road vehicle is understood to mean any vehicle equipped with an engine or motor (generally a combustion engine or electric motor) intended to move on a road network and capable of transporting people or loads (for example, a car or a motorcycle).

Each road vehicle 110 furthermore comprises a position sensor 111 for measuring a plurality of geographical coordinates of the road vehicle 110 traveling on the road network. In one example, the position sensor 111 is intended to receive signals from a GNSSZ satellite position system, such as the American GPS system, the Russian GLONASS system and/or the European GALILEO system. In the invention, the geographical coordinates include latitude, longitude and acquisition time. The invention also contemplates the use of what are called "augmentation" techniques that make it possible to improve the precision of the received geolocation signals.

In the example of FIG. 1, the data collection server 120 is intended to receive geographical coordinate measurements associated with each driving session, hereinafter called geographical traces, through crowdsourcing. In the invention, each geographical coordinate measurement is time-stamped.

In the example of FIG. 1, the processor 130 is intended to process all of the geographical traces in order to update and/or supplement the digital road map 200.

First of all, the processor 130 is designed to extract, for each geographical trace, a trajectory curve passing through all of the measurements of the geographical trace.

Next, the processor 130 is intended to detect the inflection points of each trajectory curve, hereinafter called vertices. It is recalled that an inflection point is a point where a change in the concavity of a plane curve takes place. Thus, in the invention, for a given geographical trace, a vertex corresponds to the location where a change of direction takes place in the trajectory of the associated road vehicle.

Then, the processor 130 is intended to group together all of the vertices into a plurality of vertex classes, using an unsupervised classification algorithm (unsupervised machine learning). In one example, the unsupervised classification algorithm is based on density-based clustering, such as one of those chosen from among: DBSCAN, OPTICS, CLARANS, DENCLUE, CLIQUE or any combination thereof.

In this example, the unsupervised classification algorithm takes into consideration the following grouping criteria: the latitude, the longitude and the direction of movement of the road vehicle associated with the vertex (heading). It is recalled that the direction of movement corresponds to the displacement vector of the road vehicle, which is constructed from the associated geographical traces. According to the invention, the direction of movement makes it possible to separate the two directions of travel on a given road. For example, on a road comprising two lanes, the unsupervised classification algorithm might create two vertex classes each representing one direction of travel on the road.

Thereafter, the processor 130 is intended to select the most central vertex from each vertex class, hereinafter called representative. In one example, the representative of each class is the medoid thereof. It is recalled that, in statistics, the medoid is the element of a class for which the average dissimilarity with respect to all of the elements of the class is smallest. Thus, in the invention, a representative constitutes the most likely position of a change of direction of the trajectory of a road vehicle. In fact, in the invention, it is desirable for the representative to be one of the elements of each class and not an average vector of all of the elements of the class, as the centroid may be. This makes it possible to ensure that the representative is actually located on a road.

Next, the processor 130 is intended to form, from each geographical trace, a road segment between representatives that successively intersect the course of the geographical trace when they are considered in pairs. In one particular implementation, a road segment is formed only if it is associated with a number of geographical traces that is beyond a predetermined value. For example, if a road segment is associated with fewer than 50 geographical traces, then this road segment will be deleted.

Then, the processor 130 is intended to join, based on a superposition of the geographical traces, the road segments that successively intersect the course of the superposition of the geographical traces, so as to obtain digital road sections.

Finally, the processor 130 is intended to update and/or supplement the digital road map based on the digital road sections.

In one particular implementation, the processor 130 comprises an image processing module 131 intended to add a digital layer to the digital road map 200. In practice, the digital layer comprises the digital road sections. In one example, the image processing module 131 is configured so as to add the digital layer to the digital road map 200 only when the number of geographical traces and/or the number of road vehicles taking part in the crowdsourcing is beyond a predetermined value for a predetermined period. For example, it might be possible to update the digital road map 200 only when the number of geographical traces is beyond 70 for a period of one month of acquiring geographical traces. However, other predetermined values and other predetermined periods may be contemplated. Thus, with the invention, it is possible to regularly update a digital road map.

In one particular implementation of the system 100, before updating and/or supplementing the digital road map, the processor 130 is furthermore intended to:

- calculate, for each road segment, a regression function from the geographical traces substantially following the road segment, and
- adapt the shape of each road segment based on the associated regression function, such that the road segment matches the shape of the regression function.

In one example, the regression function is obtained using a method chosen from among a polynomial regression, adaptive regression splines, or any combination thereof.

In one variant of the particular implementation, during the calculation of the regression function, the processor 130 is further intended to calculate, for each road segment, a measure of statistical dispersion between the geographical traces, wherein the measure of dispersion represents the number of lanes of the road segment. In one example, the measure of statistical dispersion is any measure from among a variance, a standard deviation, a variation coefficient, a mean variance, a sum of differences, a measure of energy, or any combination thereof. In one particular implementation, the measures of statistical dispersion are included in the abovementioned digital layer.

In another particular implementation of the computer system 100, it is contemplated for the junction between a first segment and a second segment to be formed along one of the first segment or second segment, and not only at one end of the road segment. To this end, the processor 130 is intended to discretize each road segment into a plurality of waypoints, using a predetermined distance step. Then, the processor 130 is intended to join two road segments when a first waypoint of a first road segment intersects the course of a superposition of geographical traces to join a second waypoint of a second road segment. The junction between the first waypoint and the second waypoint thus makes it possible to obtain a digital road section.

In another particular implementation of the computer system 100, before updating and/or supplementing the digital road map, the processor 130 is furthermore intended to:

- identify redundant road segments based on a distance between the segments, and
- delete the redundant road segments so as to keep only one road segment between two consecutive representatives.

In one example, the distance between a first road segment and a second road segment corresponds to the smallest distance between each waypoint of the first road segment and each waypoint of the second road segment. Of course, other distance criteria may be contemplated, such as the average distance between the first and second road segments. In the example, the processor 130 is intended to delete one of the road segments when the distance is below a predetermined distance.

Figure 2:
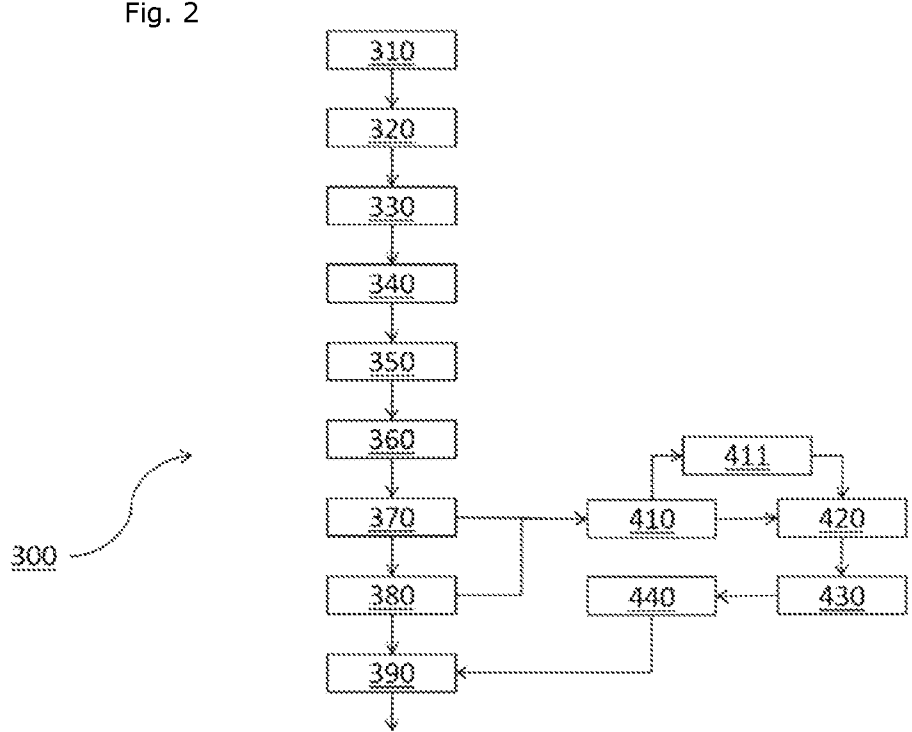
FIG. 2 shows a method according to the invention.

FIG. 2 illustrates a method 300 according to the invention. The method 300 makes it possible to update and/or supplement a digital road map 200 through crowdsourcing.

The method first of all comprises a first step of providing 310 the plurality of road vehicles 110, as described above.

Next, the method comprises a second step of providing 320 the data collection server, as described above.

Then, the method comprises a first step of extracting 330, for each geographical trace, a trajectory curve passing through all of the measurements of the geographical trace, as described above.

Thereafter, the method comprises a step of detecting 340 the inflection points of each trajectory curve, hereinafter called vertices, as described above.

Next, the method comprises a step of grouping together 350 all of the vertices into a plurality of vertex classes, using an unsupervised classification algorithm, as described above.

Then, the method comprises a step of selecting 360 the most central vertex in each vertex class, hereinafter called representative, as described above.

Thereafter, the method comprises a second step of forming 370, from each geographical trace, a road segment between representatives that successively intersect the course of the geographical trace when they are considered in pairs, as described above.

Then, the method comprises a step of joining 380, based on a superposition of the geographical traces, the road segments that intersect the course of the superposition of the geographical traces, as described above.

Finally, the method comprises a step of updating and/or supplementing 390 the digital road map based on the digital road sections, as described above.

In one particular implementation of the method 300, before the step of updating and/or supplementing the digital road map, provision is made, as described above, for:

- a first step of calculating 410, for each road segment, a regression function from the geographical traces substantially following the road segment, and
- a step of adapting 420 the shape of each road segment based on the associated regression function, such that the road segment matches the shape of the regression function.

In one variant of the particular implementation, during the first step of calculating the regression function, provision is made for a second step of calculating 411, for each road segment, a measure of statistical dispersion between the geographical traces, wherein the measure of dispersion represents the number of lanes of the road segment, as described above.

In another particular implementation of the method 300, before the step of updating and/or supplementing the digital road map, provision is made, as described above, for:

a step of identifying 430 redundant road segments based on a distance between the segments, and a step of deleting 440 the redundant road segments so as to keep only one road segment between two consecutive representatives.

In one particular embodiment of the invention, the various steps of the method 300 are defined by computer program instructions. Therefore, the invention also targets a program with a computer program code stored on a non-transient storage medium, this program code being capable of executing the steps of the method 300 when the computer program is loaded into the computer or run on the computer.

The present invention has been described and illustrated in the present detailed description and in the figures. However, the present invention is not limited to the presented embodiments. Thus, after reading the present description and studying the appended drawings, those skilled in the art will be able to deduce and implement other embodiments and variants.

The invention claimed is:

1. A computer system for updating and/or supplementing a digital road map through crowdsourcing, the computer system comprising a digital road map and:

a. a plurality of road vehicles traveling on a road network during at least one driving session, each road vehicle comprising a position sensor for measuring a plurality of geographical coordinates of the road vehicle traveling on the road network, b. at least one data collection server for receiving geographical coordinate measurements associated with each driving session, the geographical coordinate measurements serving as geographical traces, c. at least one processor for:

i. extracting, for each geographical trace, a trajectory curve passing substantially through all of the measurements of the geographical trace, ii. detecting inflection points of each trajectory curve, the inflection points serving as vertices, iii. grouping together all of the vertices into a plurality of vertex classes, using an unsupervised classification algorithm, iv. selecting a most central vertex in each vertex class, the most central vertex serving as a representative, v. forming, from each geographical trace, a road segment between representatives that successively intersect the course of the geographical trace when they are considered in pairs, vi. joining, based on a superposition of the geographical traces, the road segments that successively intersect the course of the superposition of the geographical traces to obtain digital road sections, vii. identifying redundant road segments based on a distance between the road segments, viii. deleting the redundant road segments so as to keep only one road segment between two consecutive representatives, and ix. updating and/or supplementing the digital road map based on the obtained digital road sections.

2. The computer system as claimed in claim 1, wherein the processor is further configured so as, before updating and/or supplementing the digital road map, to:

a. calculate, for each road segment, a regression function from the geographical traces substantially following the road segment, and b. adapt the shape of each road segment based on the associated regression function, such that the road segment matches the shape of the regression function.

3. The computer system as claimed in claim 2, wherein the processor is further configured so as, when calculating the regression function, to:

a. calculate, for each road segment, a measure of statistical dispersion between the geographical traces, wherein the measure of dispersion represents the number of lanes of the road segment.

4. A method for updating and/or supplementing a digital road map through crowdsourcing, the method comprising:

a. providing a plurality of road vehicles for traveling on a road network during at least one driving session, each road vehicle comprising a position sensor for measuring a plurality of geographical coordinates of the road vehicle traveling on the road network, b. providing at least one data collection server for receiving geographical coordinate measurements associated with each driving session, the geographical coordinate measurements serving as geographical traces, c. extracting, for each geographical trace, a trajectory curve passing substantially through all of the measurements of the geographical trace, d. detecting inflection points of each trajectory curve, the inflection points serving as vertices, e. grouping together all of the vertices into a plurality of vertex classes, using an unsupervised classification algorithm, f. selecting a most central vertex in each vertex class, the most central vertex serving as a representative, g. forming, from each geographical trace, a road segment between representatives that successively intersect the course of the geographical trace when they are considered in pairs, h. joining, based on a superposition of the geographical traces, the road segments that intersect the course of the superposition of the geographical traces to obtain digital road sections, i. identifying redundant road segments based on a distance between the road segments, j. deleting the redundant road segments so as to keep only one road segment between two consecutive representatives, and k. updating and/or supplementing the digital road map based on the obtained digital road sections.

5. The method as claimed in claim 4, further comprising, before updating and/or supplementing the digital road map:

a. calculating, for each road segment, a regression function from the geographical traces substantially following the road segment, and b. adapting the shape of each road segment based on the associated regression function, such that the road segment matches the shape of the regression function.

6. The method as claimed in claim 5, further comprising, during the calculating the regression function:

a. calculating, for each road segment, a measure of statistical dispersion between the geographical traces, wherein the measure of dispersion represents the number of lanes of the road segment.

7. A non-transitory computer program with a program code for executing the steps of a method as claimed in claim 4 when the computer program is loaded into the computer or run on the computer.

* * * * *